(12) United States Patent
Feuillard et al.

(10) Patent No.: US 8,016,269 B2
(45) Date of Patent: Sep. 13, 2011

(54) VOLATILE AGENT DIFFUSION DEVICE EQUIPPED WITH A BLOWER FOR AN AUTOMOBILE VEHICLE

(75) Inventors: Vincent Feuillard, Les Mesnil Saint Denis (FR); Didier Loup, Maurepas (FR); Petr Doskocil, Novy Bydzpv (CZ)

(73) Assignee: Valeo Systems Thermiques S.A.S., Les Mesnil St. Denis, Cedex (FR)

( * ) Notice: Subject to any disclaimer, the term of this patent is extended or adjusted under 35 U.S.C. 154(b) by 472 days.

(21) Appl. No.: 12/165,832

(22) Filed: Jul. 1, 2008

(65) Prior Publication Data

US 2009/0008470 A1 Jan. 8, 2009

(30) Foreign Application Priority Data

Jul. 2, 2007 (FR) ..................................... 07 04763

(51) Int. Cl.
*B01F 3/04* (2006.01)

(52) U.S. Cl. ..... 261/26; 261/30; 261/104; 261/DIG. 65; 261/DIG. 88

(58) Field of Classification Search .................... 261/26, 261/30, 104, 107, DIG. 17, DIG. 65, DIG. 88, 261/DIG. 89; 422/5, 117, 120, 123–126
See application file for complete search history.

(56) References Cited

U.S. PATENT DOCUMENTS

| | | | | |
|---|---|---|---|---|
| 4,603,030 A | * | 7/1986 | McCarthy | 472/57 |
| 4,629,604 A | * | 12/1986 | Spector | 422/124 |
| 5,167,877 A | * | 12/1992 | Pai | 261/18.1 |
| 5,178,327 A | * | 1/1993 | Palamand et al. | 239/57 |
| 5,565,148 A | * | 10/1996 | Pendergrass, Jr. | 261/30 |
| 5,695,692 A | * | 12/1997 | Kennedy | 261/30 |
| 5,805,768 A | * | 9/1998 | Schwartz et al. | 392/390 |
| 6,080,367 A | * | 6/2000 | Lin | 422/124 |
| 7,344,123 B2 | * | 3/2008 | Pankhurst et al. | 261/30 |
| 7,691,336 B2 | * | 4/2010 | Westring | 422/125 |
| 2003/0186643 A1 | | 10/2003 | Feuillard et al. | |
| 2004/0009103 A1 | * | 1/2004 | Westring | 422/125 |
| 2004/0067729 A1 | | 4/2004 | Bourbon | |
| 2005/0001337 A1 | * | 1/2005 | Pankhurst et al. | 261/104 |
| 2005/0179145 A1 | * | 8/2005 | Fan | 261/30 |

FOREIGN PATENT DOCUMENTS

| | | |
|---|---|---|
| EP | 1398187 A1 | 3/2004 |
| EP | 1702629 A1 | 9/2006 |
| FR | 2815294 A1 | 4/2002 |
| WO | WO 2004105814 A1 | 12/2004 |

(Continued)

OTHER PUBLICATIONS

English language abstract for EP 1702629 extracted from espacenet.com database, dated Feb. 2, 2009.

(Continued)

*Primary Examiner* — Richard L Chiesa
(74) *Attorney, Agent, or Firm* — Howard & Howard Attorneys PLLC (57) ABSTRACT

The invention relates to a diffusion device (1) for an automotive vehicle. The diffusion device (1) includes a housing (2) with an ambient air inlet (3), a treated air outlet (3), a diffusion chamber (4) and an insert (7). The insert (7) is located inside the diffusion chamber (4) and contains at least one volatile agent (AV1). The insert (7) can rotate via an electric motor (12) for selectively diffusing or not the volatile agent (AV1). The diffusion device (1) also includes a blower (13) fixed on the housing (2).

21 Claims, 7 Drawing Sheets

FOREIGN PATENT DOCUMENTS

WO  WO 2005100063 A1  10/2005

OTHER PUBLICATIONS

English language abstract for FR 2815294 extracted from espacenet.com database, dated Feb. 2, 2009.

English language abstract for WO 2005100063 extracted from espacenet.com database, dated Feb. 2, 2009.

INPI Republique Francaise Search Report for FR0704763, dated May 21, 2008, 1 page.

* cited by examiner

VOLATILE AGENT DIFFUSION DEVICE EQUIPPED WITH A BLOWER FOR AN AUTOMOBILE VEHICLE

RELATED APPLICATIONS

This application claims priority to and all the advantages of French Patent Application No. FR 07/04763, filed on Jul. 2, 2007.

This invention relates to a volatile agent diffusion device in a vehicle interior When a passenger wishes to condition the air of the vehicle interior, especially to perfume the surrounding air, he uses a volatile agent diffusion device and places it on an element of the vehicle interior, such as the rear view mirror. This type of device has the disadvantages of continuously diffusing a volatile agent, acting as a perfume, in the vehicle interior and of occupying a space in the vehicle interior that could impair the view of the passenger when driving the vehicle. Furthermore, such a device must be completely replaced by a new device when all of the volatile agent has been diffused, which has a cost for the passenger.

A solution to this continuous diffusion and the problem caused by the position of the volatile agent diffusion device is a diffusion device comprising a means of adjusting the diffusion, wherein said device is housed in a ventilation, heating and/or air conditioning system of the automobile vehicle or in the canals which take the air from the system into the vehicle interior.

The solution in which the diffusion device is inside the ventilation, heating and/or air conditioning system nevertheless has the disadvantage of being dependent on the operation of the ventilation, heating and/or air conditioning system. As the device is housed inside the ventilation, heating and/or air conditioning system, the diffusion of the conditioned air as a volatile agent in the vehicle interior is only carried out when the latter is operated. The diffusion of the volatile agent contained in the diffusion device is therefore conditioned by the adjustment of the flow rate and/or that of the distribution of an air flow from the ventilation, heating and/or air conditioning system. Consequently, when the ventilation, heating and/or air conditioning system is not operating, no conditioned air is diffused in the vehicle interior.

A second disadvantage of this solution is the replacement of the volatile agent. As a ventilation, heating and/or air conditioning system is generally located under the dashboard of the vehicle, replacing the volatile agent requires several elements of the vehicle to be removed, such as the dashboard or the central console. Consequently, a passenger cannot easily change the volatile agent.

When the diffusion device is located in the canals which take the air from the ventilation, heating and/or air conditioning system into the vehicle interior, the relative disadvantage of the dependence on the diffusion device with respect to the ventilation system still exists.

This invention permits the above disadvantages to be resolved and its subject matter is a diffusion device of at least one volatile agent for an automobile vehicle, comprising a housing featuring a surrounding air inlet, a conditioned air outlet and a diffusion chamber capable of accommodating an insert, wherein said diffusion chamber communicates with the surrounding air inlet and the conditioned air outlet, wherein the device further comprises an electrical actuator which drives the insert in rotation according to an axis of rotation and a blower fixed to the housing.

The diffusion device according to the invention has the following advantages. The first advantage is the autonomy of the diffusion device with respect to a ventilation, heating and/or air conditioning system. It may be understood that the diffusion device is used alone, regardless of the state of operation of the ventilation, heating and/or air conditioning system. This autonomy implies that the diffusion device may be fitted in any part of the interior of a vehicle. As it has its own surrounding air inlet, its own conditioned air outlet and its own blower, there is no need to install the diffusion device inside the ventilation, heating and/or air conditioning system or to create additional canals connecting the diffusion device to the ventilation, heating and/or air conditioning system. This saves space in the vehicle interior.

The simple implantation of the device according to the invention also provides the advantage of fitting the latter in an element of the vehicle interior that is accessible by the passenger, such as a dashboard or a central console, so that the passenger can change the volatile agent easily.

According to a first characteristic, the insert comprises at least one cartridge containing one of at least one volatile agent, wherein said cartridge is introduced into the housing or withdrawn from the housing by means of the conditioned air outlet.

According to a second characteristic, the insert comprises at least distinct two volatile agents.

According to another characteristic, a command system is connected to the actuator, wherein said command system permits the selection of at least one position of the insert to diffuse or not one of the two volatile agents and/or to adjust the flow rate of the conditioned air flow.

According to another characteristic, the level of intensity of the conditioned air flow is set by the actuator by varying the position of the insert with respect to a window of the housing.

According to another characteristic, each cartridge is held inside the insert by retaining means.

Other characteristics, details and advantages of the invention will become clearer upon reading the following description provided by way of non restrictive example in relation to the drawings in which.

Figure 1:
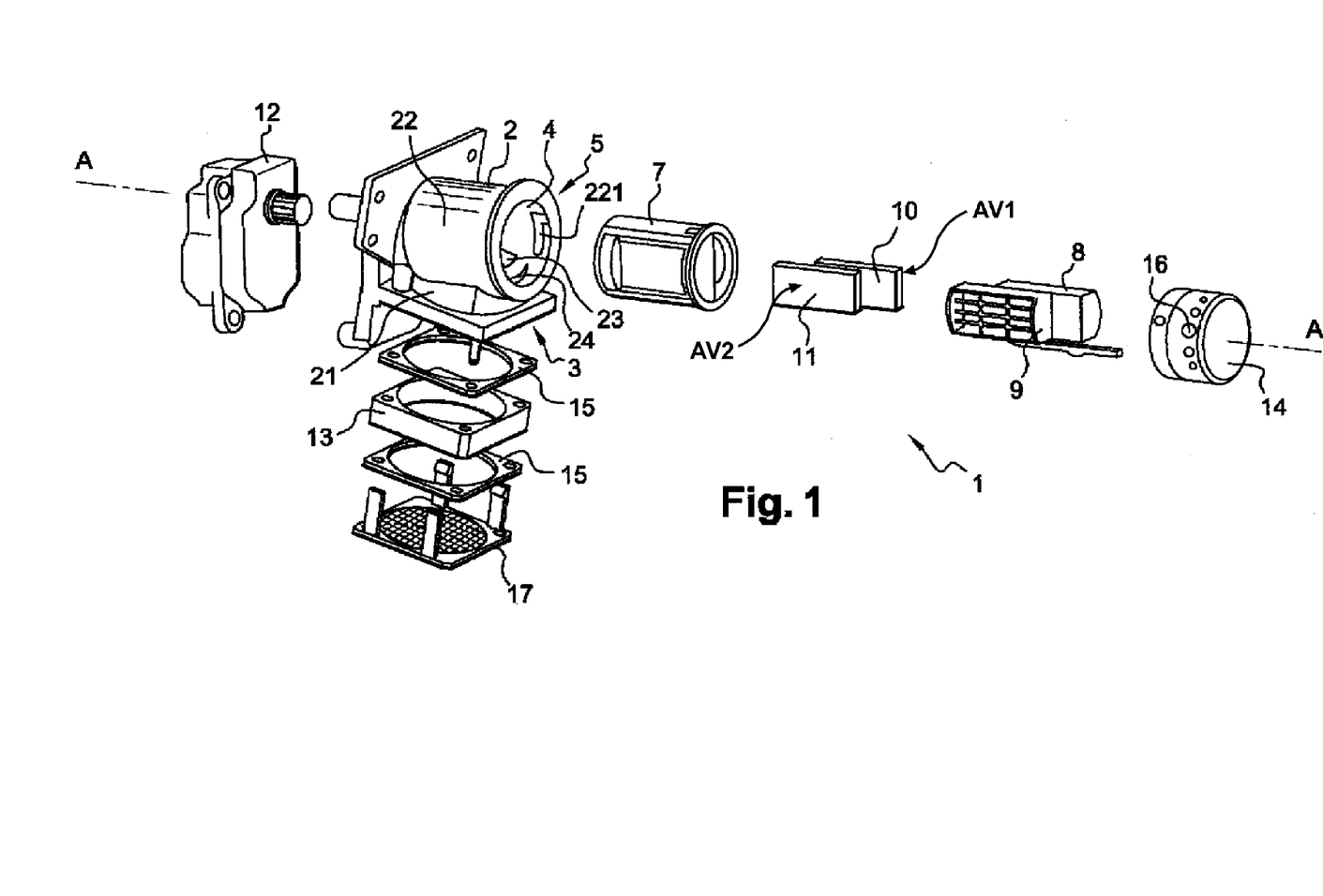
FIG. 1 is an exploded perspective view of a diffusion device according to the invention.

FIG. 1 shows a view of the diffusion device 1 according to the invention. The diffusion device 1 comprises a housing 2, an insert 7, two cartridges 8, 9 containing two wicks 10, 11, an electrical actuator 12, a blower 13 and a cap 14. The housing 2, made of plastic, such as polypropylene, comprises a diffusion chamber 4, a surrounding air inlet 3 and a conditioned air outlet 5. The surrounding air inlet 3 houses the blower 13. The latter is equipped with a grid 17 and two dampers 15. The diffusion chamber 4 is capable of accommodating the insert 7 via the conditioned air outlet 5. This insert 7 is moved by the actuator 12 according to an axis of rotation A and contains two cartridges 8, 9, wherein each one contains a wick 10, 11 containing a distinct volatile agent AV1, AV2. Finally, the cap 14 covers the conditioned air outlet 5 of the housing 2. To allow the evacuation of the conditioned air flow FT of the diffusion device 1, there are holes 16 in the cap 14.

By "volatile agent", it is meant any substance that may be diffused in an air flow. For example, a volatile agent is a scented, disinfecting, anti-bacteria, anti-allergen or fragrant substance.

Figure 2A:
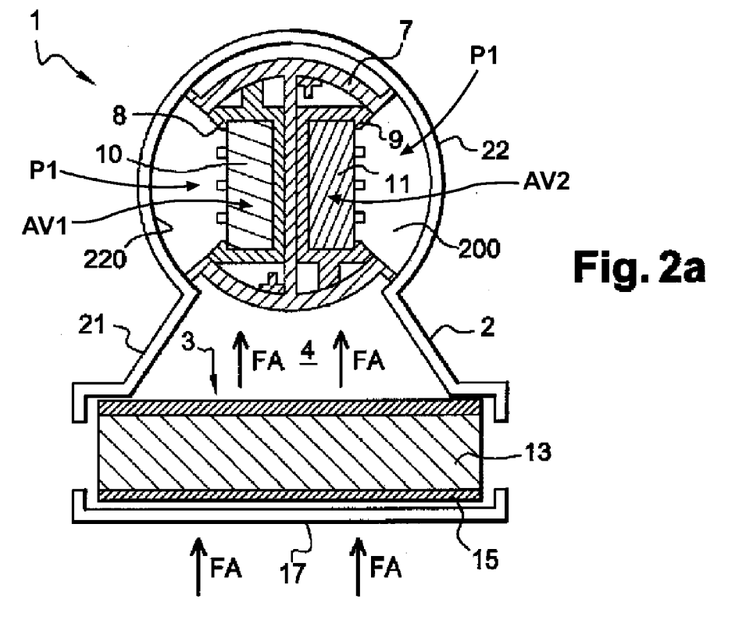
FIGS. 2a and 2b are transversal cross-section views of the diffusion device according to the invention.
Figure 2B:
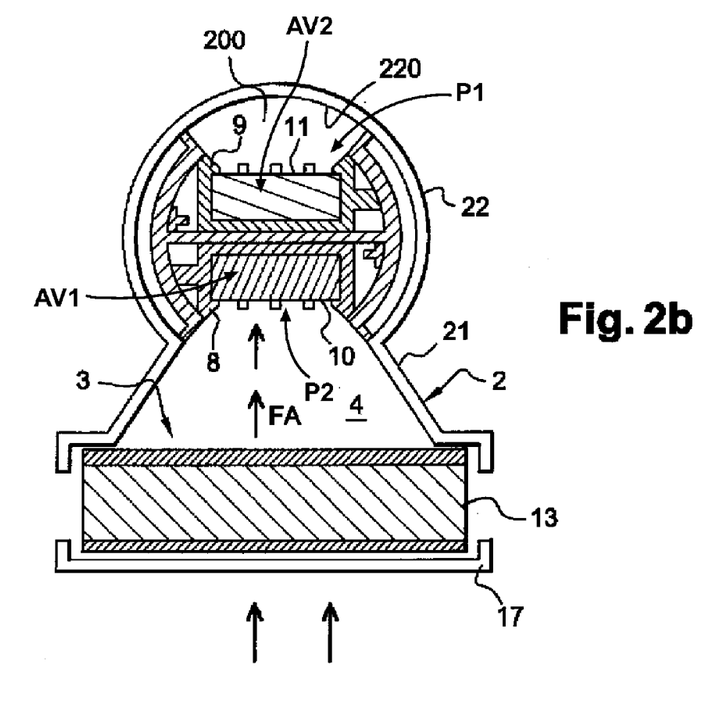

FIGS. 2a and 2b show a transversal cross-section of the diffusion device 1. The housing 2 is a single part forming a diffusion chamber 4, wherein the latter has a surrounding air inlet 3 and a conditioned air outlet 5. The housing 2 comprises a two-moulded-part assembly, which is to say a hollow cone 21 of which a first flared end forms the surrounding air inlet 3 and a hollow cylinder 22 defines a space 200 to accommodate the insert 7. More precisely, an inside wall 220 of the hollow cylinder 22 defines the accommodation space 200.

The diffusion chamber 4 houses, by means of the surrounding air inlet 3, a pulsed surrounding air flow FA that is moved by a blower 13. The latter is attached to the housing 2. The blower 13 is positioned opposite the surrounding air inlet 3. A grid 17 covers the blower 13 on the side opposite that of the surrounding air inlet 3 and avoids introducing dust or other elements which could stop the operation of the blower 13 and/or obstruct the surrounding air inlet 3. The blower 13 is of the axial type, which is to say that the surrounding air flow sucked in and the surrounding air flow FA blown out by the blower 13 flow in the same direction. The presence of the blower 13 in the diffusion device 1 implies that the latter is totally autonomous with respect to a ventilation, heating and/or air conditioning system. The diffusion device 1 may be used and diffuse at least one volatile agent AV1, AV2 in the vehicle interior without the ventilation, heating and/or air conditioning system being involved. The independence of the diffusion device 1 by integrating the blower 13 into the housing 2 also permits the diffusion device 1 to be located in any position in the interior of the vehicle.

Figure 3A:
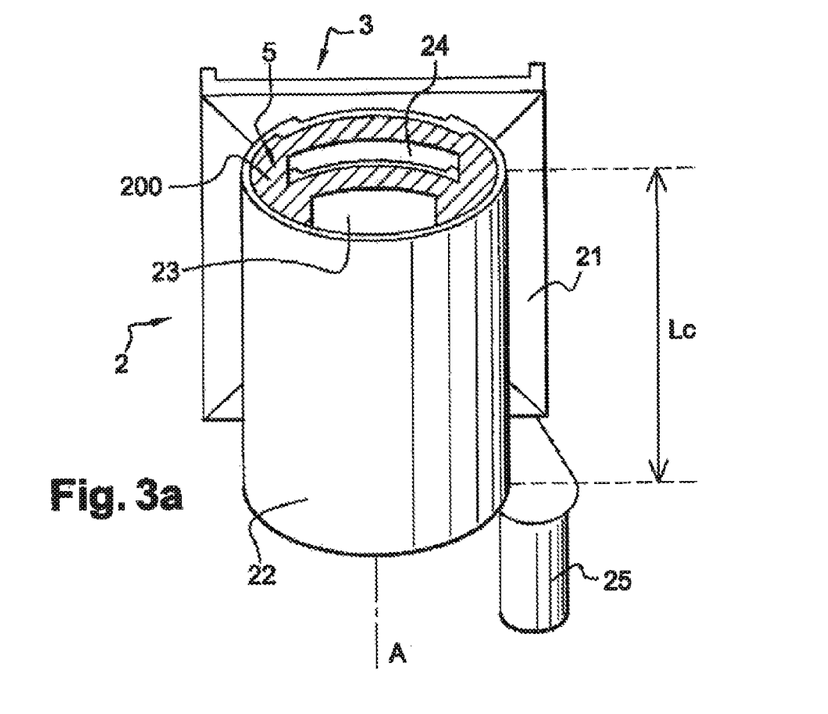
FIGS. 3a and 3b are perspective views of the housing according to the invention.
Figure 3B:
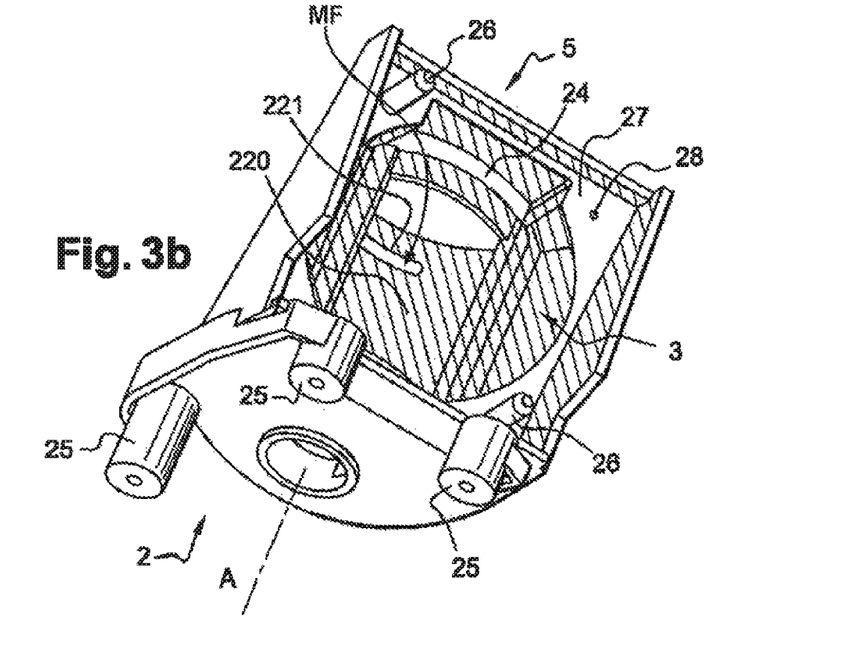

In FIGS. 3a and 3b, the housing 2 is shown on its own. According to the top view of the housing 2 of FIG. 3a, the accommodation space 200, formed by the inside of the hollow cylinder 22, communicates aeraulically with the part of the diffusion chamber 4 formed by the hollow cone 21. The hollow cylinder 22 has an axis of rotation A. By "communicates aeraulically" it is meant that the hollow cylinder 22 and the hollow cone 21 have a common opening. This communication is provided by a window 23. When the insert 7 is inside the accommodation space 200, it covers the window 23. Consequently, when a wick contained in the insert 7, is located opposite the window 23, the volatile agent AV1 is freed and mixes with the surrounding air flow FA from the surrounding air inlet 3. A slot 24 is also formed in the cylinder 22 and evacuates the conditioned air flow FT to the cap 14. This slot 24 provides the aeraulic communication between the surrounding air inlet 3 and the conditioned air outlet 5. When the insert 7 is located in the housing 2, it does not obstruct the slot 24 as its length Li is shorter than the length Lc of the hollow cylinder 22. The housing 2 also comprises a receptacle 25 containing a threaded bore that is not shown. This receptacle 25 permits the housing 2 to be attached by means of a screw onto part of the vehicle, for example a dashboard.

In FIG. 3b, the housing 2 is illustrated according to a top view. A groove 221 is made in the inside wall 220 and this operates with a protuberance 143 of the cap 14 to form attachment means MF. This groove 221 forms an "L" so that the cap 14 is attached to the housing 2 according to a bayonet type fastening. The protuberance 143 reaches the end of the groove when the cap 14 has rotated through 90° according to the axis A. A plurality of receptacles 25 is formed on the housing 2 to ensure correct attachment of the housing 2 onto an element of the vehicle. The surrounding air inlet 3 has a peripheral edge 27. The latter 27 supports the blower 13 when it is attached to the housing 2 by means of a screw which operates with a threaded bore 28 and rods 26. According to one variant of the invention, the blower 13 is attached to the housing 2 by means of glue or rivets.

Figure 4:
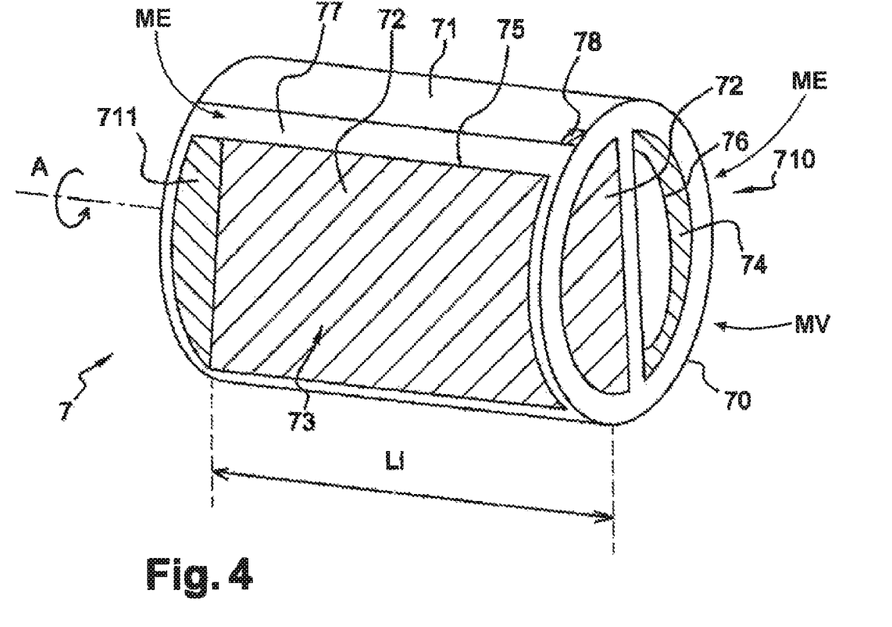
FIG. 4 is a perspective view of the insert according to the invention.

In FIG. 4, the insert 7 is shown on its own. The latter 7 is a hollow cylinder 70. This insert 7 is mobile in rotation inside the housing 2 according to an axis of rotation A by means of an actuator 12. The cylinder 70 comprises a peripheral wall 71, a first open side 710, a second closed side 711 and a partition 72. The cylinder 70 has a length Li. The partition 72 extends along the entire length Li of the cylinder 70 and divides the latter into two cavities 73, 74, each dedicated to housing a cartridge 8, 9. Each cavity 73, 74 is distinct from the other in that no aeraulic exchange, and in particular no exchange of volatile agent, may take place. The first open side 710 permits a cartridge 8, 9 to be introduced into the corresponding cavity 73, 74. The second closed side 711 permits the cartridge housed in the cavity to be held in place. The insert 7 also comprises two distinct orifices 75, 76 formed in the peripheral wall 71. Each orifice 75, 76 is associated to a cavity 73, 74. The orifices 75, 76 have a rectangular or square shape and are diametrically opposite. Between the two orifices 75, 76, the peripheral wall 71 is solid. Each orifice 75, 76 is surrounded by sealing means ME, such as a lip 77 made of a flexible plastic material, which operates with the inside wall 220 of the cylinder 22. Consequently, no simultaneous diffusion of two volatile agents is possible. The insert 7 also comprises two recesses 78, 79 that are diametrically opposite. Each recess 78, 79 is associated to a cavity 73, 74. These two recesses, which are diametrically opposite, operate with tabs 800 located on the cartridges 8, 9 to form retaining means MR.

The insert 7 contains two cartridges 8, 9, wherein each houses a wick 10, 11 containing a distinct volatile agent AV1, AV2. Each cartridge 8, 9 is made of plastic and has an identical structure. Consequently, only a first cartridge 8 will be described in relation to FIG. 5a.

Figure 5A:
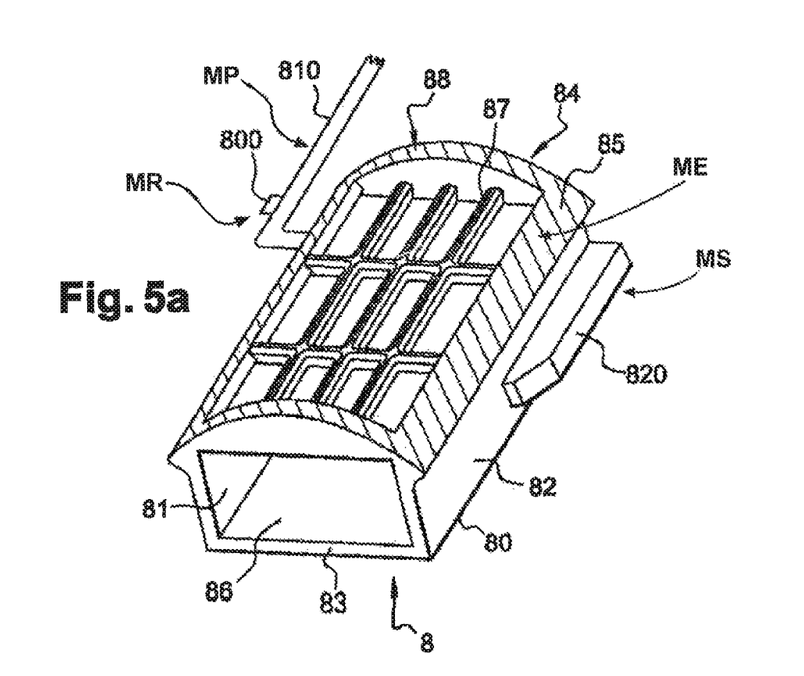
FIGS. 5a and 5b are perspective views of the cartridge according to the invention.

The first cartridge 8 is formed by a cage 80 whose general shape is rectangular according to a top view. The cage 80 comprises two longitudinal flanks 81, 82, two lateral flanks 83, 84 and two large faces 85, 86. A first lateral flank 83 is open and permits a wick 10 to be introduced. Once the first wick 10 has been inserted into the first cavity 73 of the first cartridge 8, a removable lid that is not shown is fitted onto the first lateral flank 83 to seal the latter and prevent any diffusion of the volatile agent AV1 by the first lateral flank 83. The second lateral flank 84 is solid so that the wick 10 is held in place once it is fitted inside the cage 80. On a first longitudinal flank 81, there is an "L"-shaped arm which forms a means of gripping MP the first cartridge 8. This arm 810 allows the first cartridge 8 to be removed from the insert 7. A tab 800 is located on the arm 810. This tab 800 operates with the recess 78 associated to the cavity 75 which houses the first cartridge 8 to form means of retaining MR the first cartridge 8 inside the associated cavity 73. As the arm 810 is flexible, the tab 800 may be removed from the recess 78 so as to extract the first cartridge 8 from the insert 7. On a second longitudinal flank 82, a rib 820 is formed. The later 820 operates with the peripheral wall 71 of the insert 7 to hold the cartridge 8 in position once it is inserted into the insert 7. Consequently, the rib 820 forms a means of stabilising MS the cartridge 8 in the cavity 73. This means of stabilising MS avoids the cartridge 8 moving when the insert 7 rotates inside the housing 2. The first large face 85 is formed by a grid 87 surrounded by sealing means ME, such as a flexible strip of plastic 88. The grid 87 permits both the diffusion of the volatile agent AV1 impregnated in the wick 10 and the wick 10 in the cartridge 8 to be held in place. The flexible strip of plastic 88 operates with the peripheral wall 71 to avoid diffusion of the volatile agent AV1 in the cavity 73 in which the first cartridge 8 is located. The volatile agent AV1 is consequently solely diffused by the orifice 75 of the cavity 73 containing the first cartridge 8. Therefore, no mixture of volatile agents is possible inside the insert 7 containing the two cartridges 8, 9.

Figure 5B:
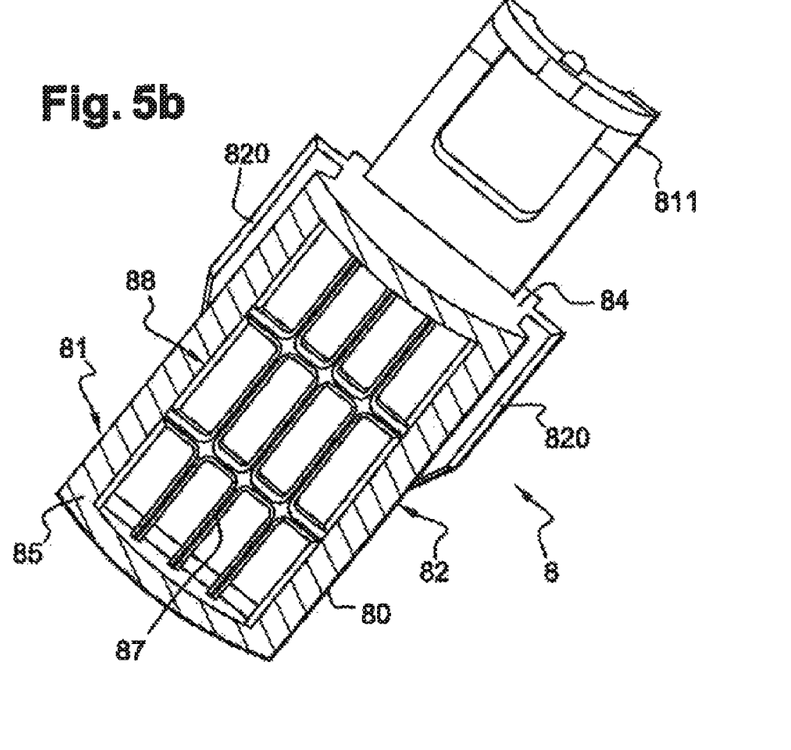

According to one variant of the embodiment of the first cartridge 8 illustrated in FIG. 5b, the second lateral flank 84 carries the gripping means MP. In this case, the gripping means MP is formed by a handle 811. As explained below, the handle 811 is hollow. Furthermore, the two longitudinal flanks 81, 82 each have stabilising means MS. Therefore, the first cartridge 8 is further held in the cavity 73 in a single position. The tab 800 is then located on one of the longitudinal flanks 81, 82.

Figure 6A:
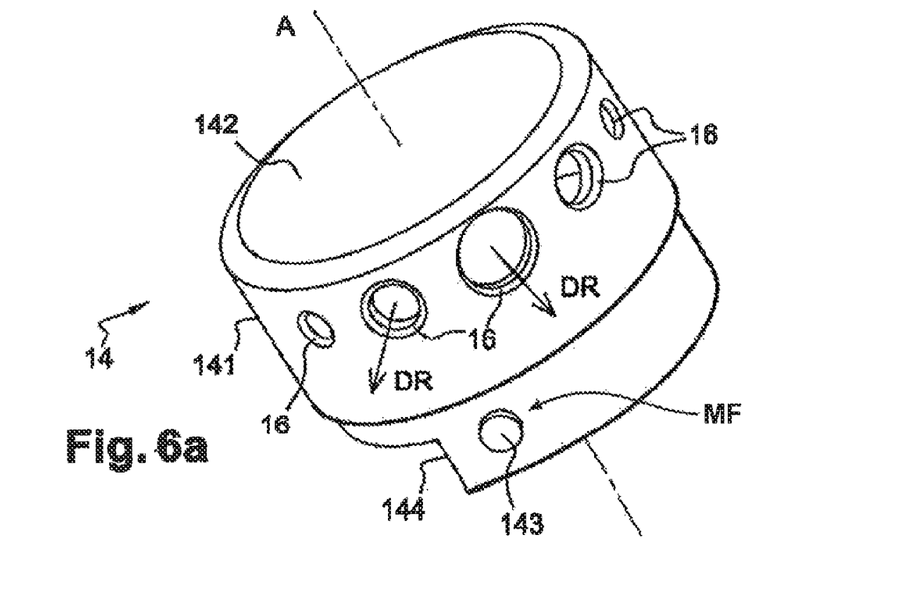
FIGS. 6a and 6b are perspective views of the cap according to the invention, the FIG. 7 is a simplified diagram of the diffusion device according to the invention.
Figure 6B:
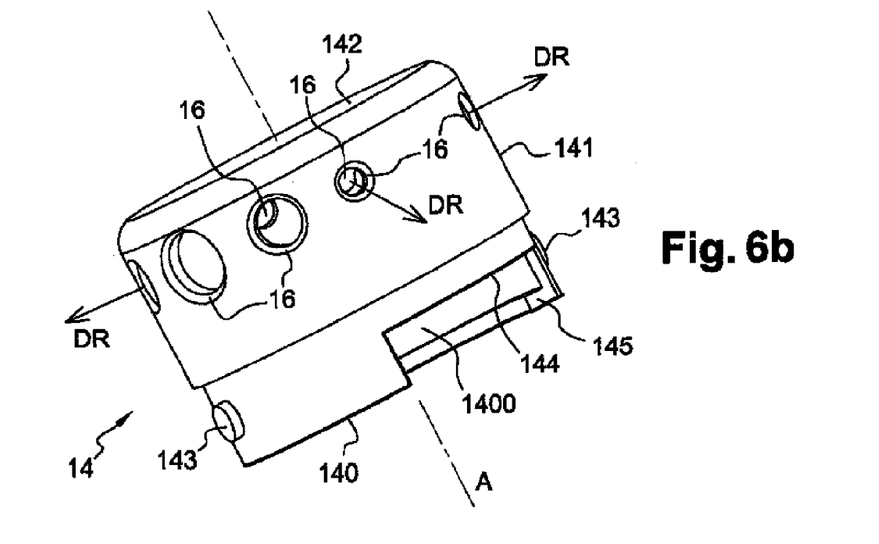

FIGS. 6a and 6b show a cap 14 according to the invention. It is made of a single part from plastic, such as polypropylene. The cap 14 is a hollow cylinder 140 with an axis of rotation A comprising a cylindrical wall 141. The cylinder 140 is sealed at one end by a lateral wall 142. The cap 14 covers the conditioned air outlet 5. There are holes 16 in the cap 14 to distribute the conditioned air flow FT according to at least one radial direction Dr with respect to the axis of rotation A. More precisely, the holes 16 are formed in the cylindrical wall 141. According to one variant of the invention, the cap 14 is equipped with a single hole 16. The position of these holes firstly provides an advantage from a design point of view. For this purpose, the holes 16 are not visible to the passenger as they are positioned on the side of the cap 14. Secondly, the specific location of these holes 16 implies homogenous distribution throughout the interior of the vehicle. A diffusion device 1 according to the invention fitted in an element of the vehicle interior, such as a dashboard, distributes a conditioned air flow FT via its holes 16 in a direction parallel to the general plane of the dashboard. Consequently, the conditioned air flow FT does not directly reach a single zone of the vehicle interior, such as the driver zone, but is distributed homogeneously in all of the zones of the vehicle interior. This homogenous distribution is further improved when the cap has two rows of holes 16 diametrically opposite. A protuberance 143 operates with the groove 221 of the housing 2, to allow the cap 14 to be attached to the housing 2. This attachment of the cap 14 onto the housing 2 is not definitive. Indeed, the cap 14 may be removed. The conditioned air outlet 5 covered by the cap 14 is also the part of the housing 2 by which the cartridges 8, 9 are removed from the diffusion device 1, the attachment means MF permits the cap 14 to be attached and/or removed. The handling of the cartridges 8, 9 to introduce or remove them is thus made easier. As described below, the cap 14 is the only element of the diffusion device 1 that is visible to the passenger when said device 1 is fitted inside the vehicle interior. Consequently, once the cap 14 has been detached from the housing 2, the passenger can only see the conditioned air outlet 5. This conditioned air outlet 5 is then the only point of access to the diffusion device 1 for the passenger and permits easy and simple withdrawal or introduction of a cartridge. The protuberance 143 is located on the cylindrical wall 141 of the cap 14. This means of attachment MF is of the bayonet type. Preferably, the cap 14 is equipped with two protuberances 143 that are diametrically opposite, as illustrated in FIG. 6b. In this case, the inside wall 220 of the housing 2 has two corresponding grooves 221. It should be noted that the cap 14 is fixed with respect to the housing 2 when the diffusion device 1 is operating. Preferably, the plurality of holes 16 is positioned in two diametrically opposite rows. In FIG. 6a, a first row 160 of five holes 16 is formed on the cylindrical wall 141. A second row 161 is positioned symmetrically with respect to the axis of rotation A. By "row" it is meant at least two holes aligned on a same circle whose centre passes through the axis of rotation A.

The cap 14 defines a conditioned air distribution chamber 1400. More precisely, the cylindrical wall 141 and the lateral wall 142 define a volume corresponding to the distribution chamber 1400. The latter 1400 comprises an air outlet formed by the hole(s) 16 and an air inlet formed by a notch 144. When the cap 14 is fixed to the housing 2, this notch 144 is opposite the slot 24. Consequently, the notch 144 and the slot 24 provide the aeraulic communication between the diffusion chamber 4 and the distribution chamber 1400. This distribution chamber 1400 contains the gripping means of each cartridge 8, 9. In order that the gripping means do not impair the distribution and evacuation of the conditioned air flow FT via the holes 16, they are modelled so as to avoid being an obstacle to the conditioned air flow FT. For example, for the gripping means of FIG. 5b, the handle 811 is hollow. In this way, this handle 811 has a general "U" shape and occupies little space in the distribution chamber 1400.

According to one variant of the invention, the diffusion device 1 comprises locking means MV which prevent the cap 14 from being detached when the insert 7 is in an operating position. These locking means MV comprise a hook 700 located on the first open side 710 of the insert 7 operating with a peripheral edge 145 of the cap 14. When the passenger wishes to remove the cap 14 while the diffusion device 1 is operating (non diffusion position or diffusion positions), the cap 14 is blocked by the hook 700. The latter 700 holds the cap 14 by its peripheral edge 145. To unlock the cap 14, two steps are necessary. Firstly, the insert 7 must be in a "cartridge change" position. This position corresponds to a slope angle of 10° with respect to the non diffusion position in which the insert 7 completely obstructs the window 23. In this cartridge change position, the hook 700 is moved to the only position in which the cap may be freed. Then, the cap is turned to free the protuberance 143 from the groove 221. In this configuration, the hook 700 and the notch of the peripheral edge 145 are then opposite one another. The peripheral edge 145 is therefore no longer retained by the hook 700 when a passenger pulls the cap 14. It is thus clear that to attach or remove the cap 14 from the housing 2, the insert 7 must be in a specific position so that its hook 700 cannot engage with the peripheral edge 145. It should be noted that for each cartridge, there is a distinct change position.

The diffusion device 1 is connected to a command system 18. The latter controls the electrical actuator 12 and the blower 13. The electrical actuator 12 is of the step-by-step actuator type. Once the diffusion device 1 is powered, the command system permits the passenger to select different parameters such as the flow rate of the conditioned air flow and/or the volatile agent AV1, AV2 diffused in the vehicle interior. Receiving command data from the command system 18, the actuator 12 positions the insert 7 so that the volatile agent AV1 selected by the passenger is diffused. The diffusion of the volatile agent AV1 may be total or partial according to the position of the insert 7. In other terms, the passenger can choose between different intensities of diffusion of the volatile agent selected. By "total" diffusion, it is meant that the grid 87 of the cartridge 8 is completely opposite the window 23, wherein the surrounding air flow FA has full impact on the wick 10. By "partial" diffusion, it is meant that part of the grid 87 of the cartridge 8 is masked by the inside wall 220 of the hollow cylinder 22 and that the other part of the grid is opposite the window 23. Consequently, the surrounding air flow FA only has an impact on part of the wick 10. To avoid the passenger from becoming too accustomed to the first volatile agent AV1, the actuator 12 modifies the flow rate of the blower 13 and/or the position of the insert 7. For example, the flow rate of the blower 13 operates according to a cycle such as a maximum flow rate for 20 seconds followed by a minimum flow rate for 40 seconds. In another example, the insert 7 is positioned for total diffusion for 20 seconds then partial diffusion for 40 seconds. A combination of the setting of the blower 13 flow rate and the position of the insert 7 is also an example. Consequently, the conditioned air flow is diffused in the vehicle interior discontinuously, which avoids the passenger from becoming too accustomed to the presence of the volatile agent in the air of the vehicle interior. The same intensity settings are available for the diffusion of the AV2 volatile agent. The command system 18 connected to the electrical actuator 12 and the blower 13 provides virtually automatic use of the diffusion device. Indeed, the command system 18 powers the diffusion device, selects the volatile agent to be diffused and the intensity of this diffusion. Only the change of cartridge is considered as manual as the passenger has to remove the cap of the device and extract the cartridge to be changed via its gripping means.

Figure 7:
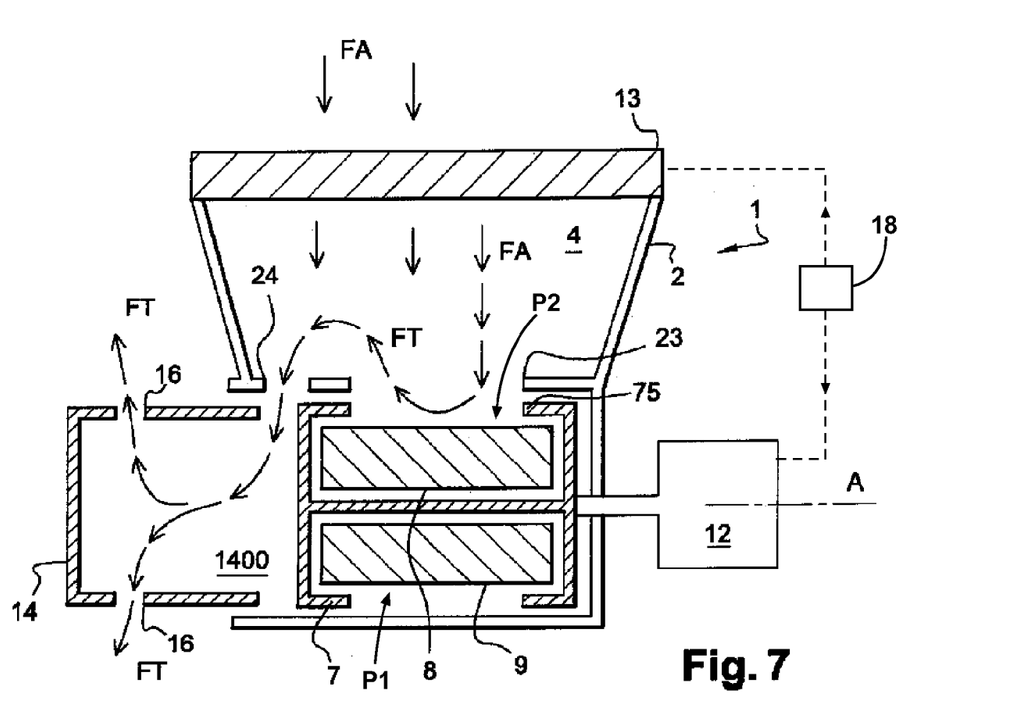

In relation to FIGS. 7, 2a and 2b, the operating mode of the diffusion device 1 will be described. In FIG. 2a, the diffusion device 1 is in a first position P1 of non diffusion. The insert 7 is moved by the actuator 12 so that its peripheral wall 71 completely obscures the window 23. The surrounding air flow FA propelled by the blower 13 thus has an impact on the solid part of the peripheral wall 71 and does not come into contact with either of the two wicks housed inside the insert 7. In FIGS. 2b and 7, the insert 7 is positioned so that a first orifice 75 is opposite the window 23. This position of the insert corresponds to a second diffusion position P2 of a first volatile agent AV1. The surrounding air flow FA, passing through the diffusion chamber 4, impacts the first wick 10 and is charged with the volatile agent AV1. The conditioned air flow FT, which is to say the air flow containing the volatile agent AV1, is evacuated from the diffusion chamber 4 by means of the slot 24. Leaving the slot 24, the conditioned air flow FT reaches the distribution chamber 1400 formed by the cap 14. Finally, the conditioned air flow FT is evacuated through the holes 16 in the cap 14. The direction Dr of the conditioned air flow FT is radial with respect to the axis of rotation A of the insert 7. It should be noted that the cap 14 does not move during the operation of the diffusion device 1. For the diffusion of the second volatile agent AV2, the electrical actuator 12 rotates the insert 7 so that the second wick 11 is opposite the window 24.

Figure 8:
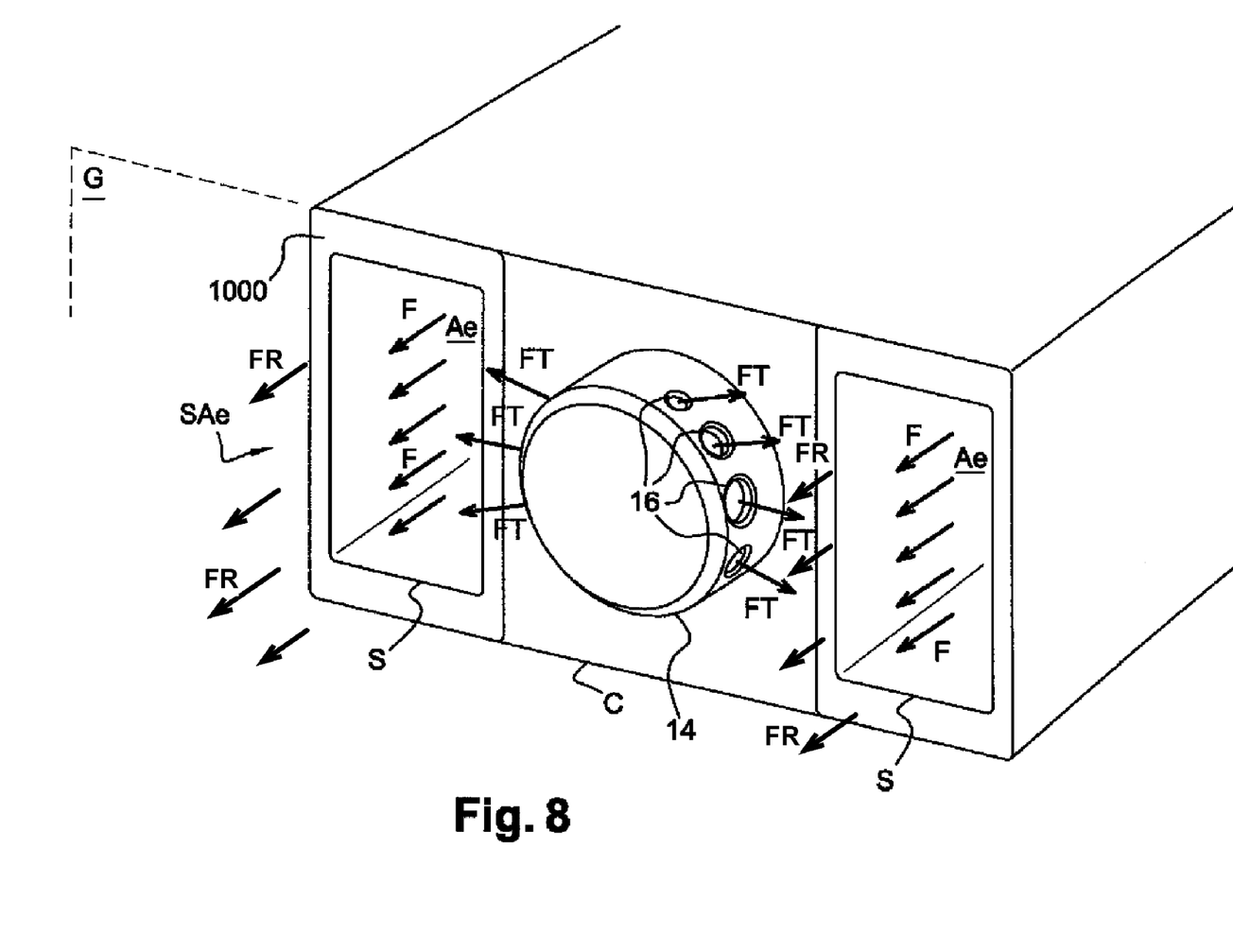
FIG. 8 is a perspective view of the diffuser support comprising the diffusion device according to the invention.

The diffusion device 1 accentuates its distribution of volatile agent when it operates with at least a diffuser Ae of a vehicle interior. FIG. 8 illustrates a diffuser support SAe comprising a frame C and two diffusers Ae. The two diffusers Ae have their respective outlet S in a plane G containing the façade 1000 of the diffuser support SAe. It should be noted that the diffuser support may comprise a single diffuser Ae. The diffuser support SAe is part of the dashboard of the automobile vehicle and is in contact with the ventilation, heating and/or air conditioning system via its diffusers Ae supplying the air flow F into the vehicle interior from the ventilation, heating and/or air conditioning system (not shown). For example, the diffuser support SAe is located in the centre of the dashboard, wherein the two diffusers of the support thus correspond to the central diffusers of an automobile vehicle. The diffusion device 1 is housed in the diffuser support SAe so that the conditioned air flow FT leaving a hole 16 meets the air flow F leaving the diffuser Ae. More precisely, the only element forming the diffusion device 1 that is visible to a passenger of the vehicle is the cap 14. The latter 14 protrudes with respect to the plane G. Furthermore, the axis of rotation A is parallel to the longitudinal axis of the automobile vehicle. More precisely, the general direction of the circulation of the conditioned air FT is perpendicular to the direction of the air flow F leaving the diffuser Ae. The meeting of the two air flows improves the diffusion of the volatile agent AV1, AV2 in the vehicle interior. To this end, the distribution of the conditioned air flow FT according to a radial direction Dr combined with the air flow F creates a resulting air flow FR which spreads throughout the interior of the vehicle in distinct multiple directions. Consequently, the volatile agent is rapidly perceived by the passengers, regardless of the position of each passenger, such as the driver's place and/or the places at the rear of the vehicle.

The invention claimed is:

1. A diffusion device (1) for diffusing at least one volatile agent (AV1, AV2) in an automobile vehicle, said device comprising a housing (2) including a surrounding air inlet (3), a conditioned air outlet (5), a diffusion chamber (4) containing a hollow cylindrical insert (7), wherein said insert (7) contains at least one cartridge (8, 9) comprising a rectangular cage, with said cartridge (8,9) housing the at least one volatile agent (AV1, AV2), wherein said diffusion chamber (4) communicates with the fresh air inlet (4) and the conditioned air outlet (5), wherein the device further comprises an electrical actuator (12) driving said insert (7) in rotation according to an axis of rotation (A), characterised in that the device (1) also comprises a blower (13) attached to the housing (2).

2. A device (1) according to claim 1, wherein said cartridge (8, 9) is introduced into the housing (2) or removed from the housing (2) by means of the conditioned air outlet (5).

3. A device (1) according to claim 1, in which the insert (7) comprises at least two distinct volatile agents (AV1, AV2).

4. A device (1) according to claim 1, in which a command system (18) is connected to the actuator (12), wherein said command system (18) permits at least one position (P1, P2, P3) of the insert (7) to be selected for the diffusion or non diffusion of one of the two volatile agents (AV1, AV2) and/or to adjust the flow rate of the conditioned air flow (FT).

5. A device (1) according to claim 1, in which the level of intensity of the conditioned air flow (FT) is adjusted by the actuator (12) by varying the position of the insert (7) with respect to a window (23) of the housing (2).

6. A device (1) according to claim 2, in which said at least one cartridge (8, 9) is held in the insert (7) by retaining means (MR).

7. A device (1) according to claim 2, in which the insert (7) comprises at least two distinct volatile agents (AV1, AV2).

8. A device (1) according to claim 2, in which a command system (18) is connected to the actuator (12), wherein said command system (18) permits at least one position (P1, P2, P3) of the insert (7) to be selected for the diffusion or non diffusion of one of the two volatile agents (AV1, AV2) and/or to adjust the flow rate of the conditioned air flow (FT).

9. A device (1) according to claim 2, in which the level of intensity of the conditioned air flow (FT) is adjusted by the actuator (12) by varying the position of the insert (7) with respect to a window (23) of the housing (2).

10. A device (1) according to claim 3, in which the level of intensity of the conditioned air flow (FT) is adjusted by the actuator (12) by varying the position of the insert (7) with respect to a window (23) of the housing (2).

11. A device (1) according to claim 4, in which the level of intensity of the conditioned air flow (FT) is adjusted by the actuator (12) by varying the position of the insert (7) with respect to a window (23) of the housing (2).

12. A device (1) according to claim 7, in which the level of intensity of the conditioned air flow (FT) is adjusted by the actuator (12) by varying the position of the insert (7) with respect to a window (23) of the housing (2).

13. A device (1) according to claim 8, in which the level of intensity of the conditioned air flow (FT) is adjusted by the actuator (12) by varying the position of the insert (7) with respect to a window (23) of the housing (2).

14. A device (1) according to claim 3, in which said at least one cartridge (8, 9) is held in the insert (7) by retaining means (MR).

15. A device (1) according to claim 4, in which said at least one cartridge (8, 9) is held in the insert (7) by retaining means (MR).

16. A device (1) according to claim 5, in which said at least one cartridge (8, 9) is held in the insert (7) by retaining means (MR).

17. A device (1) according to claim 7, in which said at least one cartridge (8, 9) is held in the insert (7) by retaining means (MR).

18. A device (1) according to claim 8, in which said at least one cartridge (8, 9) is held in the insert (7) by retaining means (MR).

19. A device (1) according to claim 9, in which said at least one cartridge (8, 9) is held in the insert (7) by retaining means (MR).

20. A device (1) according to claim 10, in which said at least one cartridge (8, 9) is held in the insert (7) by retaining means (MR).

21. A device (1) according to claim 11, in which said at least one cartridge (8, 9) is held in the insert (7) by retaining means (MR).

* * * * *